UNITED STATES PATENT OFFICE.

EMERSON H. STRICKLER, OF WHITE PLAINS, NEW YORK, ASSIGNOR TO GENERAL CHEMICAL COMPANY, OF NEW YORK, N. Y., A CORPORATION OF NEW YORK.

PROCESS OF MAKING ANHYDROUS SULFITES AND BISULFITES.

1,023,179. Specification of Letters Patent. Patented Apr. 16, 1912.

No Drawing. Application filed January 4, 1908. Serial No. 409,278.

*To all whom it may concern:*

Be it known that I, EMERSON H. STRICKLER, a citizen of the United States, resident of White Plains, Westchester county, State of New York, have invented certain new and useful Improvements in Processes of Making Anhydrous Sulfites and Bisulfites, of which the following is a specification.

My invention relates to a new process for making sulfites, and particularly anhydrous sodium bisulfite, or anhydrous sodium sulfite, and has for its chief advantages a low cost of operation, and the fact that there is little or no danger of the formation of sulfates by oxidation.

In making anhydrous bisulfite of soda ($NaHSO_3$) according to my invention, I prepare a saturated solution of sodium sulfite ($Na_2SO_3$), and to the solution I add anhydrous sodium carbonate ($Na_2CO_3$) while stirring, thus causing sodium carbonate to become suspended in sodium sulfite solution. Thereupon I pass sulfur dioxid ($SO_2$) into the suspension continuing this operation until the sulfur dioxid is no longer absorbed, but begins to escape and shows that the conversion into sodium bisulfite is complete. The following equation may perhaps represent the reaction

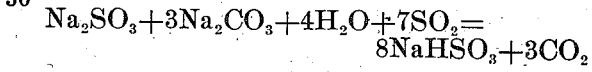

$$Na_2SO_3 + 3Na_2CO_3 + 4H_2O + 7SO_2 = 8NaHSO_3 + 3CO_2$$

In practice, more water is present than indicated by the equation, and a portion of the sodium bisulfite ($NaHSO_3$) becomes dissolved in the excess water. The undissolved portion of the bisulfite is the real product which is separated from the solution in any suitable way, as by settling or treatment in a centrifugal machine. After drying, this product is in marketable condition. It is commercially pure, containing but small amounts of $Na_2SO_3$ and practically no sodium sulfate ($Na_2SO_4$), nor is any material amount of sulfate formed by oxidation in the course of time, as long as the product is packed with reasonable care.

The supernatant or mother liquor containing $NaHSO_3$ in solution, may be neutralized with sodium carbonate, according to the following equation:

$$2NaHSO_3 + Na_2CO_3 = 2Na_2SO_3 + CO_2 + H_2O.$$

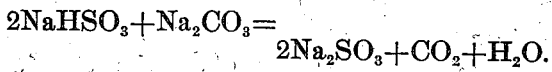

This sodium sulfite solution is then returned to the first stage of the process, so as to complete the cycle.

In practice I have found that 300 grams anhydrous sodium carbonate added to each 1000 grams of mother liquor are usually sufficient not only to neutralize the therein contained sodium bisulfite, but also to produce a suspension suitable for use in this, my new process. I have also found, in practice, that a temperature of substantially 120° Fahrenheit is usually a suitable temperature at which to operate.

The neutralization of the mother liquor (sodium bisulfite) by sodium carbonate, the formation of the suspension by the addition of sodium carbonate to the neutralized liquor and the treatment with sulfur dioxid can all be done in the same tank, which should be provided with a mechanical agitator, means for introducing the $SO_2$ gas into the body of the suspension and means for discharging the resulting solid sodium bisulfite and the supernatant liquor. Or, if preferred, separate tanks may be used for the several steps of the process, or the process may be carried out in one or more towers.

When it is desired to make neutral anhydrous sodium sulfite ($Na_2SO_3$) instead of anhydrous sodium bisulfite ($NaHSO_3$) the treatment differs from that described above only by the fact that the supply of $SO_2$ is discontinued as soon as $CO_2$ ceases to be disengaged. In this case the reaction may perhaps be represented by the following equation:

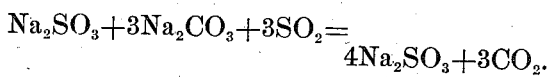

$$Na_2SO_3 + 3Na_2CO_3 + 3SO_2 = 4Na_2SO_3 + 3CO_2.$$

Instead of employing a solution of sodium sulfite having sodium carbonate suspended therein, I may use a solution of sodium carbonate in which an excess of sodium carbonate is suspended. The production of sodium bisulfite in that case might perhaps be represented by the following equation:

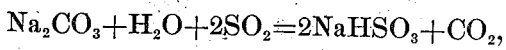

$$Na_2CO_3 + H_2O + 2SO_2 = 2NaHSO_3 + CO_2,$$

and the production of sodium sulfite as follows:

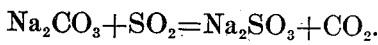

$$Na_2CO_3 + SO_2 = Na_2SO_3 + CO_2.$$

Again, I may employ a solution of sodium bisulfite having sodium carbonate suspended therein, and produce from it anhydrous sodium bisulfite in the same manner, that is, by the introduction of sulfur dioxid, as indicated by the equation:

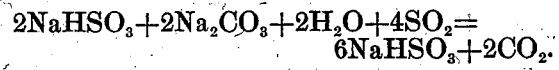

Or, using less $SO_2$ to produce $Na_2SO_3$, we have

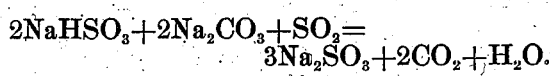

When sodium bisulfite is added to sodium carbonate, it is at once converted into sodium sulfite so that, strictly speaking, at no time is sodium carbonate suspended in sodium bisulfite.

It will be seen that I introduce $SO_2$ into a vehicle in which $Na_2CO_3$ is suspended, said vehicle in the cases described being either a solution of $Na_2SO_3$, or of $Na_2CO_3$, and in all cases being a vehicle, the affinity of which for sulfur dioxid is not greater than that of sodium carbonate. Of course, I might use as an equivalent a mixture of two of these solutions or all three, but in any event, the solution or mixture of solutions should contain $Na_2CO_3$ in suspension. If the admission of $SO_2$ is stopped when $CO_2$ ceases to be disengaged, the process will produce anhydrous $Na_2SO_3$; if the supply of $SO_2$ is continued beyond this point, anhydrous $NaHSO_3$ will be obtained.

I claim as my invention—

1. The improvement in the art of manufacturing an anhydrous sulfite salt of sodium which consists in bringing together sulfur dioxid, and sodium carbonate suspended in a suitable vehicle.

2. The improvement in the art of manufacturing an anhydrous sulfite salt of sodium which consists in bringing together sulfur dioxid, and sodium carbonate suspended in a liquid vehicle, the affinity of which for said sulfur dioxid is not greater than that of sodium carbonate.

3. The improvement in the art of manufacturing an anhydrous sulfite salt of sodium which consists in bringing together sulfur dioxid, and sodium carbonate suspended in a sodium salt solution.

4. The improvement in the art of manufacturing an anhydrous sulfite salt of sodium which consists in bringing together sulfur dioxid, and sodium carbonate suspended in a solution of sodium sulfite.

5. The improvement in the art of manufacturing an anhydrous sulfite salt of sodium which consists in bringing together sulfur dioxid, and sodium carbonate suspended in a suitable liquid vehicle, removing the solid sodium salt thus formed and using the supernatant liquid as a vehicle for a fresh amount of sodium carbonate.

6. The improvement in the art of manufacturing an anhydrous sulfite salt of sodium which consists in bringing together sulfur dioxid, and sodium carbonate suspended in a saturated sodium salt solution.

7. The improvement in the art of manufacturing anhydrous bisulfite of sodium which consists in bringing together sulfur dioxid, and sodium carbonate suspended in a solution of sodium sulfite.

In testimony whereof I have hereunto subscribed my name, in the presence of two subscribing witnesses, this 31st day of December, 1907.

EMERSON H. STRICKLER.

Witnesses:
JOHN LOTKA,
JOHN A. KEHLENBECK.